J. LAUTH.
Thill-Coupling.
No. 205,753. Patented July 9, 1878.
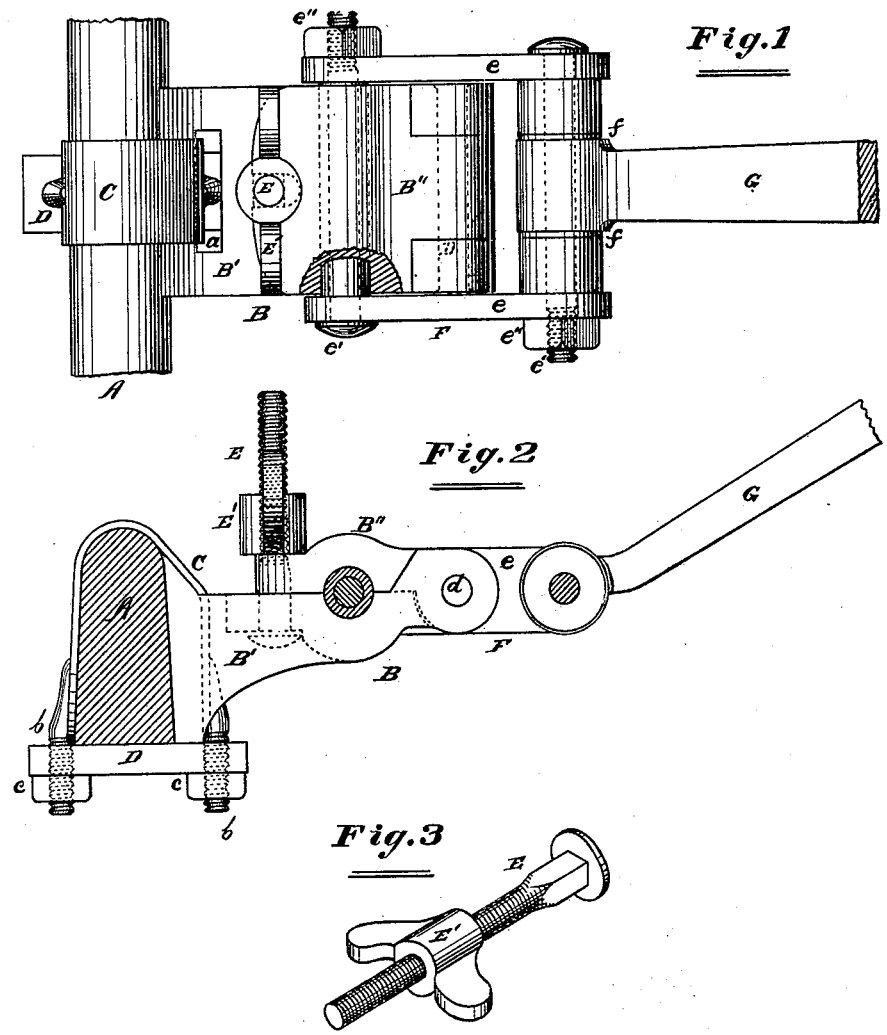
INVENTOR:
Jacob Lauth
By F. F. Warner, his
Attorney.
ATTEST:
James H. Coyne

UNITED STATES PATENT OFFICE.

JACOB LAUTH, OF CHICAGO, ILLINOIS.

IMPROVEMENT IN THILL-COUPLINGS.

Specification forming part of Letters Patent No. 205,753, dated July 9, 1878; application filed January 15, 1878.

*To all whom it may concern:*

Be it known that I, JACOB LAUTH, of Chicago, in the county of Cook and State of Illinois, have invented a new, useful, and Improved Thill-Coupler, of which the following is a specification, reference being herein had to the accompanying drawings, forming a part hereof, and in which—

Figure 1 is a top or plan view of a coupling embodying my improvements; Fig. 2, a vertical longitudinal section, and Fig. 3 a perspective of the bolt and nut detached.

Like letters of reference indicate like parts.

In the drawings, A represents the axle; and B is the clip. This clip consists of two parts, B' and B'', both made of cast metal. The part B' has a broad rear face or base, and is slotted, as shown at $a$, to receive the strap C, which passes over the axle and terminates at its lower ends in the screws $b\ b$. The screws $b\ b$ pass through female screws in a cross-bar, D, and the nuts $c\ c$ are then run upon the projecting ends of the screws, thus clamping the part B' firmly to the axle. The part B'' lies upon the part B', and the forward end of the former is stoutly hinged to the forward end of the latter by means of the pintle $d$, the forward ends of the parts B' B'' being matched and bored in the manner usual in hinges, as represented.

E is a bolt, firmly attached to and extending upward from the part B'; and E' is a winged or flanged nut, run upon the upper end or screw-threaded part of the bolt E. The part B'' extends rearward sufficiently to be clamped down upon the part B' by the nut E', and may be notched on its rear edge to receive the bolt, and thus expose a greater bearing-surface to the nut.

F is a link, to the forward end of which the thill-iron G is hinged. The rear end of the link F lies between the part B' and the leaf B'', about midway between the bolt E and the pintle $d$, the parts B' and B'' being formed to receive the rear end of the link while they are closed, each part of the clip partly engaging the link, as represented.

In order that thill-irons as usually made may be used in connection with the thill-coupling or clip now described, I deem it best to make the link F of the side pieces $e\ e$, connected to each other by means of the bolts $e'\ e'$ and the nuts $e''\ e''$. Small sleeves or washers $f\ f$ may be applied to the forward bolt $e'$ to center the thill-iron thereon, and packing may be applied to prevent the rattling of the rear bolt $e'$ in the clip, and also to render the thill-iron noiseless on its bolt.

By employing the bolt E, and causing it to project above the clip, and by using the movable nut E' thereon, the nut need not be wholly removed in order to unlock the leaf B'', and the nut is not liable to be lost, even if it should become loose; neither is it liable to become so loose as to allow the clip to open sufficiently to release the thills accidentally. Also, by hinging the parts B' and B'' to each other at their forward ends, most of the strain is thrown upon the pintle $d$ instead of upon the bolt E.

The clip may be readily applied, and the thills removed and replaced with facility.

I am aware that thill-couplings consisting of a clip having a leaf hinged thereto at its rear end, and locked by means of a screw-bolt passing into or through its forward end, have heretofore been made, and therefore, as well as for the reasons already mentioned, I do not claim such; but,

Having thus described my invention, what I claim as new, and desire to secure by Letters Patent, is—

1. In a thill-coupling, the clip B, consisting of the parts B' and B'', hinged to each other at their forward ends, in combination with the bolt E, extending above the clip and arranged near the rear end of the leaf B'', and having thereon the movable hand-nut E', substantially as and for the purposes specified.

2. In combination, the link F, consisting of the side pieces $e\ e$, connected to each other by bolts and nuts, the clip B, consisting of the parts B' and B'', hinged to each other at their forward ends, the bolt E, and the nut E', substantially as and for the purposes specified.

JACOB LAUTH.

Witnesses:
    F. F. WARNER,
    JAMES H. COYNE.